United States Patent [19]

Seidel et al.

[11] Patent Number: 5,761,627
[45] Date of Patent: Jun. 2, 1998

[54] POWER-ASSISTED STEERING SYSTEM

[75] Inventors: Mathias Seidel, Meerbusch; David Vile, Schwalmtal-Amern, both of Germany

[73] Assignee: TRW Fahrewrksysteme GmbH & Co. KG, Dusseldorf, Germany

[21] Appl. No.: 481,429

[22] PCT Filed: Oct. 16, 1994

[86] PCT No.: PCT/EP94/03407

§ 371 Date: Oct. 12, 1995

§ 102(e) Date: Oct. 12, 1995

[87] PCT Pub. No.: WO95/11152

PCT Pub. Date: Apr. 27, 1995

[30] Foreign Application Priority Data

Oct. 16, 1993 [DE] Germany .......................... 43 35 390.8

[51] Int. Cl.$^6$ ........................................................ B62D 5/06
[52] U.S. Cl. ........................ 701/41; 701/42; 180/442; 180/443; 180/446
[58] Field of Search ................... 364/424.051, 424.052; 180/422, 442, 428, 446; 60/468

[56] References Cited

U.S. PATENT DOCUMENTS

| 4,204,584 | 5/1980 | De Maighi | 180/404 |
| 4,392,540 | 7/1983 | Michio et al. | 180/422 |
| 4,557,842 | 12/1985 | Drutchas | 180/442 |
| 5,022,482 | 6/1991 | Andersson et al. | 180/406 |
| 5,197,787 | 3/1993 | Matsuda et al. | 303/10 |
| 5,267,627 | 12/1993 | Frank et al. | 180/422 |
| 5,372,214 | 12/1994 | Haga et al. | 180/422 |
| 5,477,675 | 12/1995 | Ingraham et al. | 60/418 |

FOREIGN PATENT DOCUMENTS

| 3622217 | 1/1988 | Germany . |
| 390862 | 1/1991 | Germany . |

Primary Examiner—Tan Q. Nguyen
Attorney, Agent, or Firm—Tarolli, Sundheim, Covell, Tummino & Szalo

[57] ABSTRACT

A power-assisted steering system for a vehicle comprising a hydraulic motor (1) for providing vehicle steering assistance, an open center servo-valve (6) for supplying the hydraulic motor (1) with hydraulic fluid, a hydraulic pump (7) for supplying hydraulic fluid to the servo-valve (6) and to the hydraulic motor (1), and an electric motor (13) for driving the hydraulic pump (7). The hydraulic pump (7) is controlled by controlling electrical power consumed by the electric motor (13). At least one sensor (15) repetitively monitors at least one operating parameter of the power-assisted steering system. At least one microprocessor (17) repetitively calculates reference values that vary as a function of a monitored level of the at least one operating parameter. Control of the electrical power consumed by the electric motor (13) is based on a comparison of reference values calculated as a function of a first monitored level of the at least one operating parameter with a second subsequent monitored level of the at least one operating parameter. The at least one microprocessor (17) is operable to recalculate the reference values as a function of the second monitored level of the at least one operating parameter based on a comparison of the first monitored level of the at least one operating parameter with the second monitored level.

13 Claims, 4 Drawing Sheets

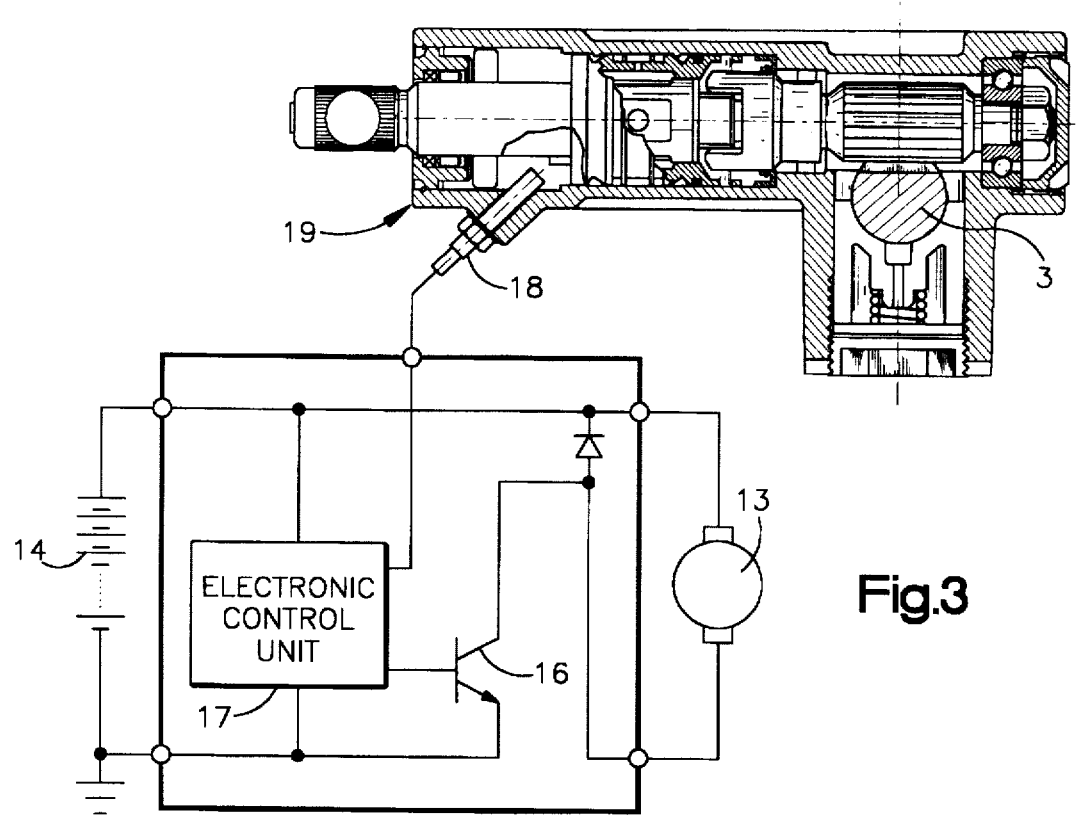
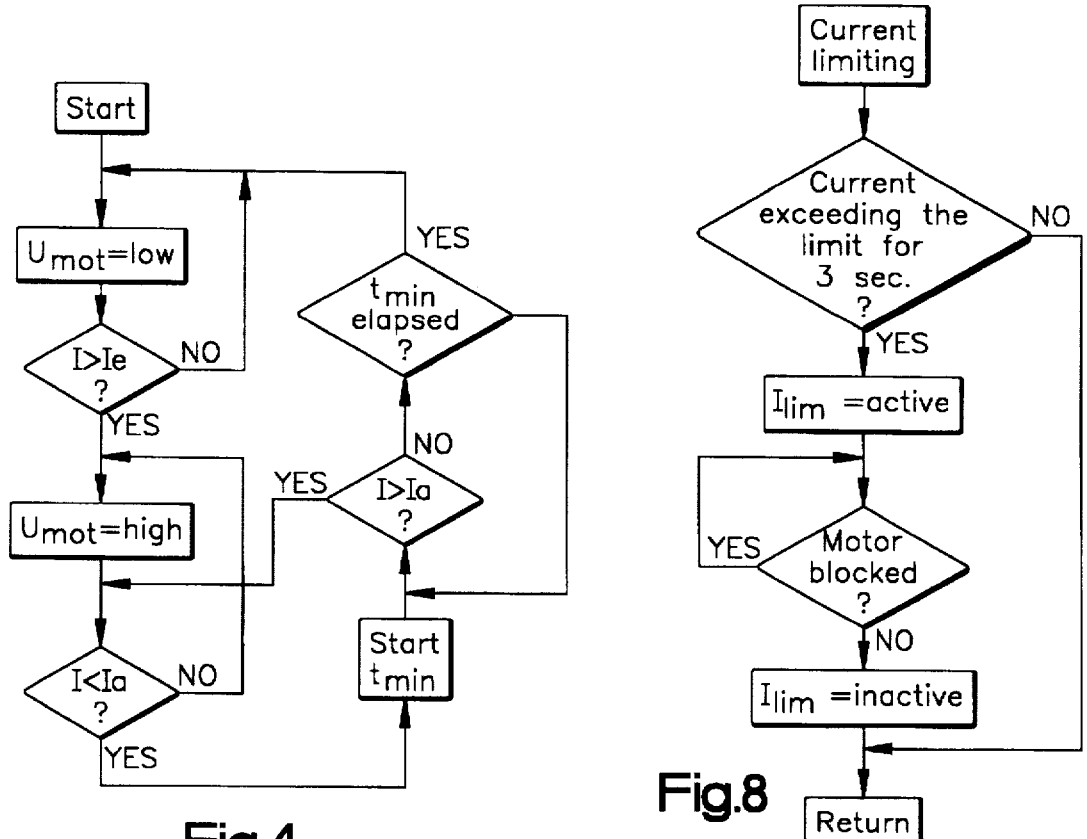

F = Factor
H = Hysteresis
$I_{lim}$ = Current limitation
Limit = Briefly permitted maximum current
MW = Minimum motor current that has occured so far
$P_{mot}$ = Operating mode of the motor
So = Upper threshold
Su = Lower threshold
Current = Present motor current
Motor high = Subprogram (Fig. 7)
Current limiting = Subprogram (Fig. 8)

POWER-ASSISTED STEERING SYSTEM

BACKGROUND OF THE INVENTION

The invention pertains to a power-assisted steering system with a servo-valve that is open at its center and serves for supplying an actuator element with hydraulic pressure, and with a pump that is driven by an electric motor and serves for supplying the servo-valve with hydraulic fluid, with the power consumption of the electric motor being controlled by an electronic unit as a result of the comparison between operating parameters that are monitored by sensors and fixed reference values.

One known type of servo-valve that is utilized in power-assisted steering systems is the servo-valve with a so-called open center. In the neutral position of a servo-valve with an open center, hydraulic fluid is pumped at low pressure through the open valve into a reservoir by means of a pump. When turning the input shaft of the servo-valve relative to the valve sleeve, hydraulic pressure is supplied to a hydraulic motor such that the movement of the steering rack of the steering system is assisted in one of the two possible directions. In these known servo-valves with an open center, the pump for supplying hydraulic fluid to the servo-valve is driven by the motor of the vehicle via a V-belt. One disadvantage of these known servo-valves with an open center is that a continuous, strong flow of the hydraulic medium is maintained even in the neutral position of the servo-valve because the pump is directly connected to the motor of the motor vehicle. Consequently, some of the power generated by the motor is lost due to the dynamic pressure and the volume flow. One additional disadvantage of known power-assisted steering systems is that the power-assistance of the steering system is deactivated as soon as the motor of the motor vehicle is turned off, e.g., when towing a stranded vehicle.

DE-OS 3,622,217 discloses a power-assisted steering system in which an electric motor is used for driving the pump. In this known power-assisted steering system, the hydraulic pressure is monitored by means of a pressure sensor, with the pump drive motor being switched into at least one of three positions, namely on, minimum and maximum, in dependence on the hydraulic pressure.

One additional power-assisted steering system of this type is known from DE-OS 3,920,862. This system also utilizes an electric motor for driving the pump, with said electric motor being additionally controlled by a signal that depends on the speed of the motor vehicle.

These known power-assisted steering systems are based on the idea that the electric motor only needs to be supplied with a minimum of energy as long as the servo-valve is situated in the neutral position. In this condition, the electric motor only need drive the pump such that a minimum hydraulic pressure is maintained. When turning the steering wheel, a higher hydraulic pressure is required, i.e., the electric motor is switched into an operating state of higher power consumption. In this case, it is, in principle, desired that this switching take place in dependence on an input torque that is applied to the input shaft of the servo-valve. In order to realize this with respect to the switching technology, it is, for example, possible to measure the power consumption of the electric motor, which represents a measure of the required hydraulic pressure. Below a certain nominal value of the hydraulic pressure, the electric motor operates in the lower power consumption range, with the switching into the higher power consumption range taking place once the nominal pressure value has been reached.

However, all these known power-assisted steering systems have the disadvantage that a torque-dependent switching point cannot be insured. The progression of the required pressure as a function of the input torque has the shape of a parabola. It is known that this parabola which normally-intersects the pressure axis initially shows only a flat increase below a certain limiting pressure. Slight differences between such systems, e.g., due to manufacturing tolerances or wear, can already influence the position of the parabola on the pressure axis. In particular, the temperature of the hydraulic oil significantly influences the position of the pressure curve as a function of the torque. If the oil is very cold and has a very high viscosity, the pressure in the neutral position of the servo-steering valve is already very high. If the switching point between the power consumption ranges of the electric motor is defined as an absolute pressure value in dependence on this pressure minimum, said switching point inevitably travels on the pressure curve as the hydraulic oil heats up because the pressure required in the neutral position drops. This leads to the fact that, after a certain operating time, the switching of the electric motor from one power consumption range to another takes place at a later time, i.e., beginning at a higher torque. Consequently, a torque-dependent switching point cannot be insured.

One additional disadvantage of known power-assisted steering systems can be seen from the fact that the switching of the electric motor between different power consumption ranges only takes place in dependence on the required hydraulic pressure. This leads to the fact that the motor is switched into the higher power consumption range beginning at a certain torque-dependent and remains in this higher power consumption range until the torque-dependent is again reduced. If turning the steering wheel in a motor vehicle in the vicinity of a curb, it may happen, for example, that the tires contact the curb or the steering wheel is turned to its limit despite the fact that a maximum torque is applied and the motor operates in the highest power consumption range. If this condition continues for a sufficient time, the temperature of the motor is unusually increased and can cause destruction of the control electronic or the motor.

Known power-assisted steering systems of this type also are associated with the disadvantage that it is very difficult to monitor their functions. Malfunctions usually can only be detected once one of the structural elements of the power-assisted steering system fails. This usually leads to a complete pressure loss, and consequently a loss of the power-assist function of the steering system.

The previously described disadvantages cause severe load on the pump drive motor and the corresponding sensors as well as the electronics of the power-assisted steering system such that high wear and inferior service life result. In addition, the displacement of the torque-dependent switching point also has a disadvantageous influence on the operating comfort.

SUMMARY OF THE INVENTION

The invention is based on the objective of improving power-assisted steering of this type in such a way that lesser wear and consequently a prolonged service life is attained with less load on the structural elements of the power-assisted steering system and improved operating comfort. In addition, the invention discloses a method for controlling the electric pump drive motor.

According to the invention, this objective is attained connecting sensors to a control unit that comprises at least one microprocessor and defines reference values in dependence on monitored operating parameters.

This solution according to the invention makes it possible to define reference values that represent the switching limits in dependence on operating parameters, i.e., based on the monitoring of operating parameters. It is, for example, possible to carry out a temperature compensation of the switching point between a minimum and a maximum power consumption range. Manufacturing tolerances, wear and the like can be compensated correspondingly because it can be insured that the switching point actually is torque-dependent in the desired fashion.

The invention advantageously proposes that the electronics comprise a current sensor that measures the power requirement of the pump. The power consumption of the electric motor represents a measure of the power requirement of the pump. During an excursion of the servo-valve, a higher hydraulic pressure needs to be generated by the pump which, in turn, causes a higher power requirement of the pump. The sensor measures this power requirement of the pump and the electronic control unit allows a switching transistor to connect the motor to the full operating voltage as soon as the required power exceeds a limiting value. In the other instance, the electronics switch the supply voltage of the electric motor back into the standby mode once the power requirement of the pump drops below a limiting value. In this case, the control for switching off the supply voltage is designed in such a way that the power requirement of the pump needs to fall short of the limiting value for a certain duration in order cause the supply voltage to switch off. This minimum duration is provided so as to not impair the steering comfort due to the fact that the pump is started and stopped again within short intervals such that the hydraulic pressure in the servo-valve varies intensely. A current sensor makes it possible for a power-assisted steering system according to the invention to react very sensitively to the power requirements of the pump. According to one advantageous embodiment of the invention,-the control unit determines a minimum power consumption of the electric motor by means of the current sensor so as to define a reference value for the switching point between certain power consumption ranges. This measure insures that the power requirement in the neutral position of the respective operating state serves as the basis for calculating the switching point. Consequently, temperature variations and the like cannot have disadvantageous effects on the switching points, i.e., the switching into each operating state can take place based on the same occurring torque.

According to additional proposals of the invention, the electronics can comprise a pressure sensor that measures the pressure variations of the servo-valve as soon as an excursion of the servo-valve from the neutral position takes place or a proximity sensor scans the position of one structural component in the steering gear and measures the operating state of the servo-valve with the aid of the position of said structural component. The pressure sensor makes it possible to directly define hydraulic pressure parameters. A proximity sensor would, for example, make it possible to determine the excursion of a reaction piston in the servo-valve and consequently a torque-dependent initial value. In all types of sensors, the sensor signal is evaluated in an electronic control unit that determines the supply voltage of the electric motor therefrom. A comparison between the current sensor signal and the corresponding predetermined limiting values is carried out in this control unit. The operating state of the electric motor is switched to full power or standby as soon as the sensor signal exceeds or falls below a limiting value.

According to one proposal of the invention, the electric motor operates in standby mode when the hydraulic cylinder is in the neutral position. Due to this minimum voltage or the standby mode of the pump, the power-assisted steering system according to the invention has a very short reaction time; consequently, power-assistance is available with almost no delay during an excursion and in the neutral position. If the electric motor and consequently the pump would be switched off in the neutral position of the servo-valve, the motor speed would have to be accelerated from zero to full speed during an excursion of the servo-valve such that no power-assistance would be available at the beginning of the steering movement. According to one additional advantageous proposal of the invention, the control unit activates current limiting of the electric motor once a selected operating parameter has exceeded a predetermined limiting value for a predetermined duration. The value to which the current is limited can lie significantly below the limiting value. This measure makes it possible to prevent the aforementioned load on the structural components as well as the possible destruction of said components while the steering wheel is turned to either limit stop. According to one additional proposal of the invention, the electronic comprises a Hall sensor. This Hall sensor can be used for determining the rotational speed of the shaft of the electric motor or rotational movements of the shaft in general. It is, for example, possible to determine if a change in the torque-dependent pressure requirements takes place after activating the current limiting such that the system can be switched back into the normal operating state.

According to one additional proposal of the invention, the control unit monitors at least two operating parameters as part of a plausibility check. The control unit defines at least two operating parameters that usually are functionally related, e.g., the rotational speed of the shaft of the electric motor and the hydraulic pressure, via the sensors. Both operating parameters mast be related to one another. This can, for example, be realized due to the fact that the control unit carries out a comparison to value tables. If this relation does not exist, one can conclude that functional problems are present. This measure also makes it possible to detect functional problems early. The control unit is advantageously provided with a memory for storing the value tables, intermediate values, program routines and the like.

The invention proposes a method for controlling the electric pump drive motor of a power-assisted steering system of this type in which reference values are defined in dependence on at least one monitored operating parameter so as to carry out a comparison to monitored operating parameters.

The method according to the invention insures that reference values, e.g., switching values, can be adapted to the respective operating states.

It was explained previously that servo-steering valves of this type are manufactured with certain variations in the characteristic pressure difference/torque line. The power consumption of the electric motor is mainly controlled within the range around the zero point (central position of the steering wheel) so as to reduce the energy consumption. Within this range, changes, e.g., changes in the pressure increase, are particularly noticeable. Consequently, the control behavior will vary strongly between one steering system and another steering system. In addition, temperature variations influence the viscosity of the oil in the steering system. Oil has a high viscosity at low temperatures. This causes an increased circulation pressure in the steering system which, in turn, influences the speed and current of the motor. If one of these values is acquired, the control electronics interpret this as a steering movement. This in turn causes the electronics to switch the motor into the incorrect operating state. This results in an increased energy consumption and a higher noise level than necessary.

According to one advantageous proposal of the invention, the power consumption of the electric motor is monitored as an operating parameter. According to additional proposals of the invention, the hydraulic pressure and the rotation of the shaft of the electric motor can be monitored.

It is particularly advantageous that the minimum power consumption be determined within regular time intervals and that this value be used as the basis for calculating a switching point between the power consumption ranges of the electric motor.

The evaluation of the current signal serves for determining minimum values that indicate to which level the current has dropped thus far. The comparison value is, for example, now briefly set above the minimum value. If this comparison value is exceeded, said fact is detected as a steering deflection and the motor is supplied with the corresponding power. Once the steering system warms up, the viscosity of the oil and consequently the circulation pressure and the current decrease or the speed increases. This is detected by means of the minimum value and the comparison value is set anew. This measure makes it possible to always attain a constant sensitivity of the control unit, namely independent of variations in the steering system or temperature.

According to one additional advantageous proposal of the invention, the power supply of the electric motor is limited once at least one selected operating parameter has exceeded a fixed upper reference value for a predetermined duration. It was explained previously that it is considered disadvantageous that known power-assisted steering systems consume excess power if the steering wheel is turned to either limit stop in order to generate a high pressure because the steering valve is closed. Moreover, this does not provide any advantages, but rather leads to an intense heating of the motor and the electronics such that said components can be destroyed very rapidly if no temperature cut-off is provided.

It is advantageous that the current be continuously monitored. If the limiting value is exceeded for longer than three seconds for example, current limiting that limits the current is activated. This measure significantly reduces the power losses, but simultaneously causes the motor to be almost blocked. However, this is not critical because the steering system is already situated at one limit stop. The movement of the rotor of the motor is now monitored,. e.g., by means of Hall sensors. Once the motor again turns more rapidly, this means that the steering system is no longer situated at either limit stop and the current limitation can be switched off again such that the steering system is returned to the normal operating state.

It is particularly advantageous that the calculation of the reference values be carried out in a clocked fashion. It is particularly advantageous that monitored operating parameters that are functionally related be subjected to a plausibility check. This can, for example, be carried out with the aid of stored value tables.

Inter-related operating parameters include for example, the hydraulic pressure and the rotational speed of the shaft of the electric motor, as well as the rotational speed of the pump shaft, the temperature and the like. Such operating parameters are measured and it is determined, e.g., with the aid of value tables, whether the measured combination of values is plausible. If this is not the case, one can conclude that a functional problem is present and this functional problem can, for example, be pinpointed.

The invention discloses a power-assisted steering system and a method which make it possible to design a power-assisted steering system in a more comfortable fashion and attain extended service life.

BRIEF DESCRIPTION OF THE DRAWINGS

Additional details and advantages are disclosed in the following description of the enclosed figures that schematically illustrate two embodiments of a power-assisted steering system according to the invention. The figures show:

FIG. 3: a circuit diagram of a power-assisted steering system as well as the steering gear with a proximity sensor which are illustrated in the form of a longitudinal cross section;

FIG. 4: a flow chart that illustrates the processing of the sensor signal in the electronic control unit;

FIG. 8: a flow chart that illustrates the activation of current limiting.

DESCRIPTION OF THE PREFERRED EMBODIMENTS

Figure 1:
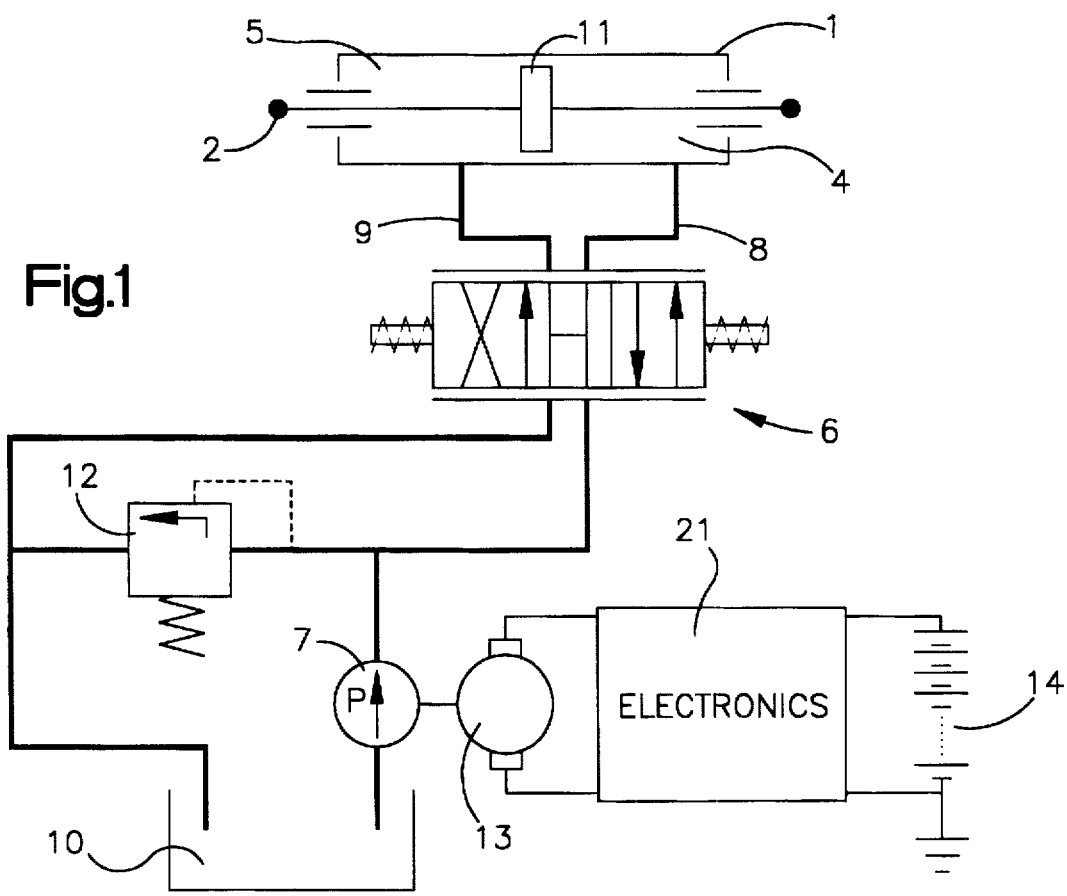
FIG. 1: a hydraulic diagram and a circuit diagram of a power-assisted steering system with a current sensor.

A power-assisted steering system is used in association with a not-shown mechanical steering system in order to reduce the steering torque to be applied via the steering wheel. This is realized by means of a hydraulic cylinder 1, the piston rod 2 of which is connected to a steering tie rod 3 (illustrated in FIG. 3). The chambers 4 and 5 of the hydraulic cylinder 1 are charged with hydraulic fluid in dependence on the steering deflection by means of a pump 7 via a servo-valve 6, through the lines 8 and 9.

The hydraulic diagram in FIG. 1 shows that the hydraulic fluid is pumped from a reservoir 10 to the hydraulic cylinder 1 via the servo-valve 6 by means of the pump 7. If the hydraulic fluid is, for example, pumped into the chamber 4 via the line 8, the piston 11 that is arranged on a piston rod 2 is moved toward the left such that the hydraulic fluid is displaced from the chamber 5 back to the servo-valve 6 via the line 9. This hydraulic fluid then flows back into the reservoir 10. In the neutral position of the hydraulic cylinder 1 and the servo-valve 6 which is illustrated in FIG. 1, no hydraulic fluid reaches the hydraulic cylinder 1. The hydraulic fluid is only pumped from the reservoir 10 back into the reservoir 10 through the servo-valve 6 by means of the pump 7. A pressure control valve 12 that produces a short circuit between the pump 7 and the reservoir 10 for instances in which the hydraulic fluid cannot be discharged via the servo-valve 6 or the servo-valve 6 and the hydraulic cylinder 1 is also arranged in the hydraulic diagram for safety reasons.

Figure 2:
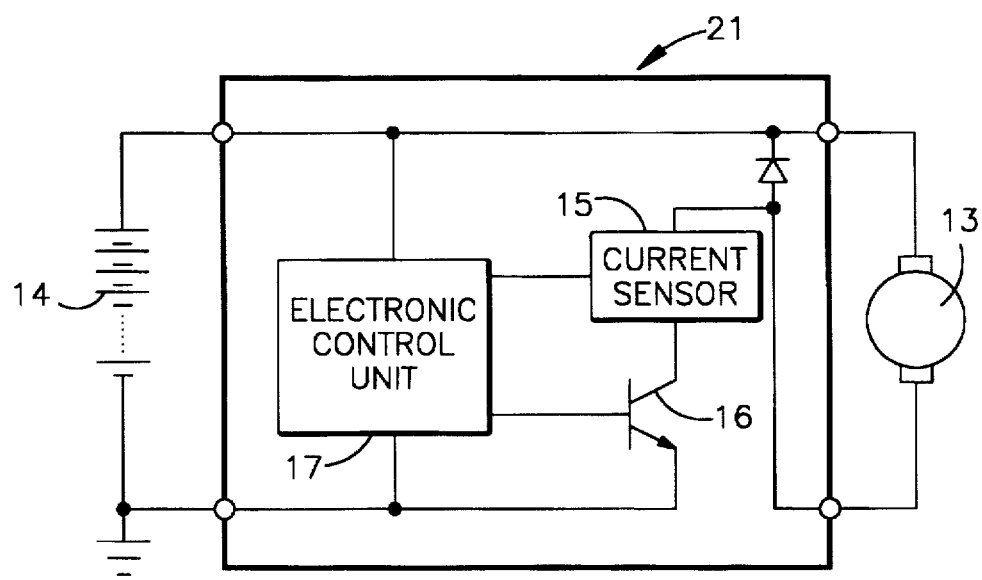
FIG. 2: a detailed representation of the electronics with a current sensor which is only illustrated in the form of a block diagram in FIG. 1.

The pump 7 that serves for conveying the hydraulic fluid is driven by an electric motor 13 that is supplied with voltage by the battery 14 of the motor vehicle via electronics 21. A detailed illustration of the electronics 21 is shown in FIG. 2. In order to realize a voltage supply of the electric motor 13 that depends on the respective requirements, a current sensor 15 is provided which measures the power requirement of the pump 7 and conveys said power requirement to a switching transistor 16 via an electronic control unit 17. The basic function of this electronic control unit 17 is shown in the flow chart according to FIG. 4.

Instead of the current sensor 15 illustrated in FIG. 2, the power-assisted steering system according to FIG. 3 can also be equipped with a proximity sensor 18 that scans the position of a suitable structural component in the steering gear 19. The information of the proximity sensor 18 is again fed to the electronic control unit 17 which evaluates this signal in accordance with the flow chart illustrated in FIG. 4 and determines the supply voltage of the electric motor 18 therefrom.

According to FIG. 4, the electronic control unit 17 operates as follows:

At the beginning, the motor voltage $U_{mot}$ is low, i.e., the pump 7 operates in standby mode. The signal I that is fed to the switching transistor 16 by the current sensor 15 via the electronic control unit 17 is compared with an adjusted switch-on limiting value Ie, with the motor 13 or the pump 7 being connected to the full motor voltage $U_{mot}$ if the limiting value Ie is exceeded. This motor voltage $U_{mot}$ is maintained until a signal I that is smaller than a switch-off value Ia is fed from the current sensor 15 to the electronic control unit 17. If the signal falls below this switch-off limiting value Ia, the motor voltage $U_{mot}$ is switched back such that the pump 7 operates in standby mode. A minimum duration $t_{min}$ is provided so as to prevent the steering comfort from being impaired due to the rapid alternation between switching on and switching off the full motor voltage $U_{mot}$. The motor voltage $U_{mot}$ is only switched back again once this minimum duration $t_{min}$ has been exceeded.

Figure 5:
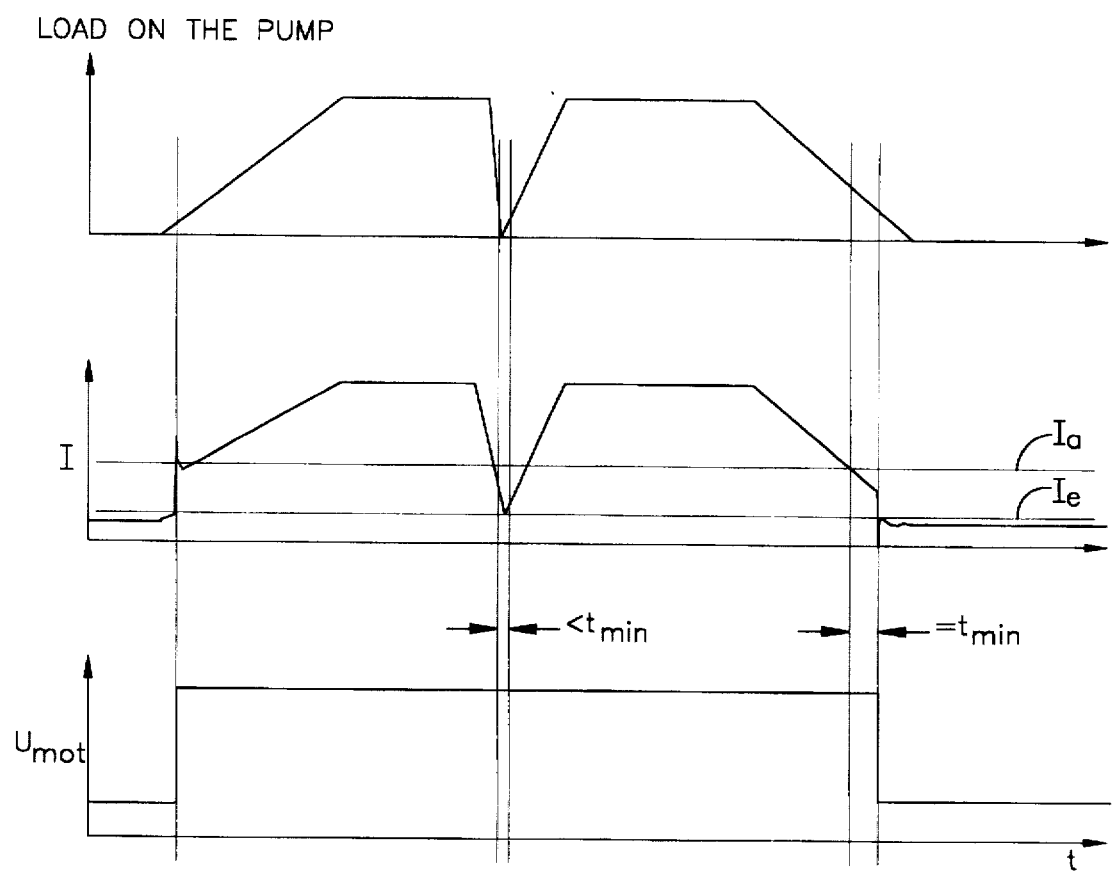
FIG. 5: a diagram that illustrates the time history of the motor voltage in dependence on the current flowing through the switching transistor and the load on the pump.

The dependence of the motor voltage $U_{mot}$ on the current I which is realized by means of the switching transistor 16 as well as the load on the pump 7 are illustrated in FIG. 5. These diagrams show that the full motor voltage $U_{mot}$ is made available as soon as the current signal exceeds the switch-on limiting value Ie. The motor voltage $U_{mot}$ is switched back into standby mode if the current signal I falls short of the switch-off limiting value Ia for a minimum duration $t_{min}$.

A power-assisted steering system that is designed in this fashion insures that the power-assist of the steering system is also guaranteed if the motor of the motor vehicle is not in operation because the pump 7 for supplying the servo-valve 6 or the hydraulic cylinder 1 with hydraulic fluid is driven by the electric motor 13 which receives its supply voltage from the battery 14. On the other hand, the utilization of the current sensor 15 or the proximity sensor 18 in association with the electronic control unit 17 and the switching transistor 16 make it possible to realize a power consumption of the pump 7 that depends on the respective requirement such that an increased service life of the components, a reduced noise development and a reduced energy consumption are attained. It is particularly advantageous that the electronics 21 which comprise the current sensor 15 or a pressure sensor and the electronic control unit 17 as well as the switching transistor 16 be subsequently installed into existing power-assisted steering systems.

Figure 6:
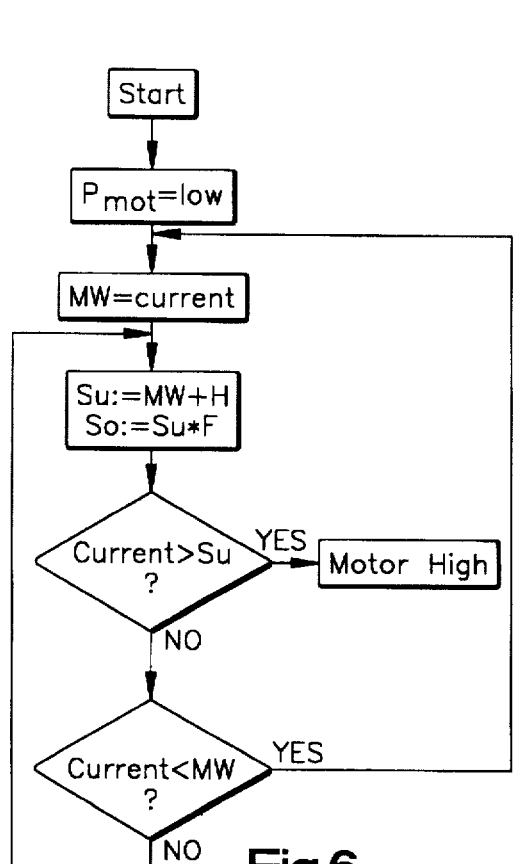
FIG. 6: a flow chart that illustrates the processing and defining of the reference values for switching into a higher power consumption range.
Figure 7:
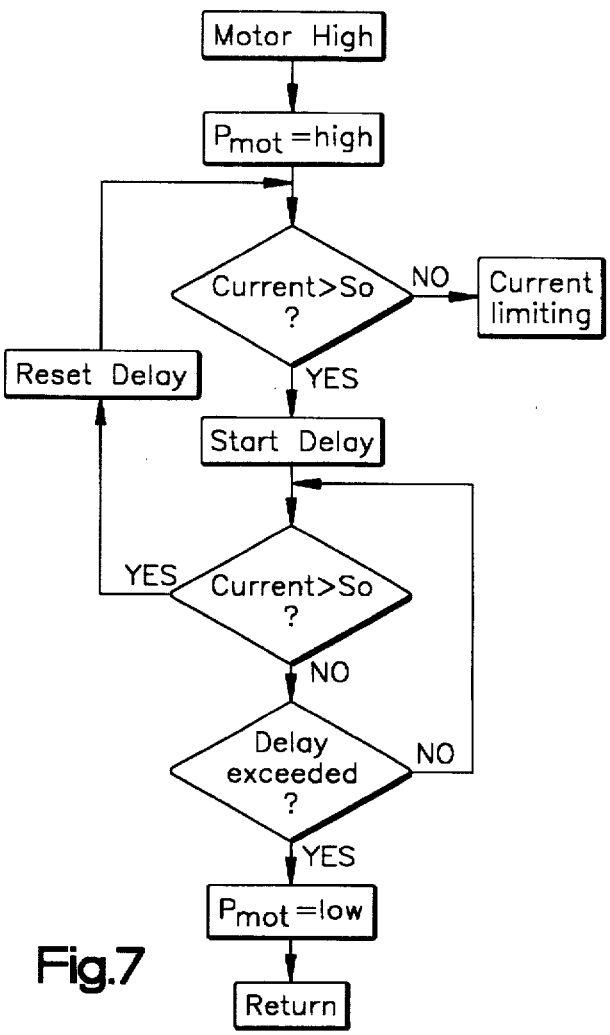
FIG. 7: a flow chart that illustrates the processing of the reference values for switching into a lower power consumption range.

The flow charts illustrated in FIGS. 6, 7 and 8 show one example for controlling the method according to the invention. FIG. 6 shows the basic program and FIGS. 7 and 8 show the flow charts for the subprograms. Originating from the starting point according to FIG. 6, the motor is initially switched into an operating state of low power consumption. The minimum current value MW is measured by means of the sensors and used for calculating the lower and upper threshold Su, So. Subsequently, it is ascertained if the present motor current exceeds the lower threshold. As long as this is not the case, it is determined whether the motor current falls below the thus far measured minimum motor current MW. If this is the case, the control returns to the point at which MW is measured. However, if this is not the case, the routine returns to the point at which it is determined whether the present motor current exceeds the lower threshold Su. The two aforementioned routines are continued until it is determined that the present motor current exceeds the lower threshold Su. In this case, the so-called "motor high"-routine illustrated in FIG. 7 is activated. During this routine, the operating mode of the motor is initially set to high in a first step. Subsequently, it is determined whether the current is below the upper threshold So. A time interval is initially started. Subsequently, it is determined whether the current has again exceeded the upper threshold So (the steering wheel is turned again). If this is the case, the time interval is reset again and the evaluation is repeated. If the current now again falls below the upper threshold, the time interval is started anew and it is determined whether the current has again exceeded the upper threshold So. If this is not the case, it is determined whether the time interval is concluded, i.e., "delay elapsed"? As long as this is not the case, the evaluation is repeated. If the current again rises above the upper limit within this time interval, the time interval is again reset and the upper operating state is maintained. However, if the time interval check has been concluded, the lower operating state is adjusted and the routine returns to the main routine.

During the routine illustrated in FIG. 7, as long as the present motor current is above the lower threshold Su, it is regularly determined whether the motor current is still below the upper threshold So. The routine "current limiting" which is illustrated in FIG. 8 is activated at the time at which the present motor current exceeds this upper threshold.

In the routine shown in FIG. 8, it is initially determined whether the upper threshold So has been exceeded for three seconds. If this is not the case, i.e., if the present motor current again falls below this threshold within three seconds, the routine returns to the "motor high" routine according to FIG. 7. However, if the present motor current remains above the upper threshold So for three seconds, a current limitation that only supplies the motor with a lower current is activated. A sensor evaluation, e.g., the evaluation of a Hall sensor, allows the determination of whether the shaft of the electric motor rotates or the motor is blocked. As long as the motor is blocked, said motor remains in its state and the current limitation remains active. However, if the shaft of the electric motor rotates, this means that the operating conditions have changed, i.e., the pressure has dropped. The current limitation is deactivated again and the routine returns to the "motor high" routine.

List of Reference Symbols

1 Hydraulic cylinder
2 Piston rod
3 Steering tie rod
4 Chamber
5 Chamber
6 Servo-valve 7 Pump
8 Line
9 Line
10 Reservoir
11 Piston
12 Pressure control valve
13 Electric motor
14 Battery
15 Current sensor
16 Switching transistor
17 Control unit
18 Proximity sensor
19 Steering gear
20 Steering gear
21 Electronics
$U_{mot}$=Motor voltage
I=Current
Ie=Switch-on limiting value
Ia=Switch-off limiting value
$t_{min}$=Minimum duration

We claim:

1. A power-assisted steering system for a vehicle comprising:
   a hydraulic motor for providing vehicle steering assistance;
   an open center servo-valve for supplying said hydraulic motor with hydraulic fluid;
   a hydraulic pump for supplying hydraulic fluid to said servo-valve and to said hydraulic motor;
   an electric motor for driving said hydraulic pump; and
   means for controlling said hydraulic pump by controlling electrical power consumed by said electric motor, said means including at least one sensor which repetitively monitors at least one operating parameter of said power-assisted steering system, said means further including at least one microprocessor which repetitively calculates upper and lower threshold values that vary as a function of said at least one operating parameter;
   said means controlling the electrical power consumed by said electric motor based on a comparison of reference values calculated as a function of an initial value of said at least one operating parameter with a subsequent value of said at least one operating parameter;
   said at least one microprocessor being operable to recalculate said threshold values as a function of said subsequent value of said at least one operating parameter based on a comparison of said initial value of said at least one operating parameter with said subsequent value.

2. The power-assisted steering system as set forth in claim 1 wherein said at least one sensor comprises a current sensor which measures the electrical power required by said hydraulic pump.

3. The power-assisted steering system as set forth in claim 2 wherein said at least one microprocessor determines a minimum power consumption via said current sensor in order to calculate said threshold values for switching said electric motor between power consumption ranges.

4. The power-assisted steering system as set forth in claim 3 wherein said at least one sensor further comprises a pressure sensor which measures pressure changes in said servo-valve.

5. The power-assisted steering system as set forth in claim 1 wherein said at least one sensor comprises a proximity sensor which measures the relative position of a structural component of the power-assisted steering system.

6. The power-assisted steering system as set forth in claim 1 wherein said electric motor is supplied with a minimum voltage and operates in a standby mode when either said hydraulic motor or said servo-valve are in a neutral position.

7. The power-assisted steering system as set forth in claim 1 wherein said at least one microprocessor evaluates said at least one operating parameter and determines the electrical power consumption of said electric motor therefrom.

8. The power-assisted steering system as set forth in claim 1 wherein said at least one microprocessor activates a current limiting means for limiting the current to said electric motor if said at least one operating parameter exceeds one of said threshold values for a predetermined duration.

9. The power-assisted steering system as set forth in claim 8 wherein said at least one sensor includes a Hall-effect sensor for determining whether said electric motor is blocked.

10. The power-assisted steering system as set forth in claim 1 wherein said at least one microprocessor monitors at least two operating parameters of said power-assisted steering system being monitored by at least two sensors as part of a plausibility check.

11. A method for controlling an electrical motor which drives a hydraulic pump in a power-assisted steering system, said method comprising the steps of:
   (a) providing means for controlling electrical power consumed by the electric motor, said means including at least one sensor for monitoring at least one operating parameter of the power-assisted steering system and at least one microprocessor for calculating upper and lower threshold values which vary as a function of said at least one operating parameter;
   (b) measuring an initial value of said at least one operating parameter;
   (c) calculating said threshold values as a function of said initial value of said at least one operating parameter;
   (d) measuring a subsequent value of said at least one operating parameter;
   (e) comparing said subsequent value with said threshold values;
   (f) adjusting the electrical power to the electric motor based on the results of step (e);
   (g) comparing said subsequent value of said at least one operating parameter with said initial value;
   (h) recalculating said threshold values if said initial value exceeds said subsequent value, and then returning to step (d); and
   (i) returning to step (e) without recalculating said threshold values if said subsequent value exceeds said initial value.

12. The method of claim 11 wherein said at least one operating parameter being monitored is electrical power consumed by the electric motor.

13. The method of claim 12 wherein step (f) includes limiting the electrical power supplied to the electric motor if said subsequent value exceeds one of said threshold values for a predetermined duration.

* * * * *